US00RE47964E

(19) United States
(12) Reissued Patent
Lee et al.

(10) Patent Number: US RE47,964 E
(45) Date of Reissued Patent: *Apr. 28, 2020

(54) DISPLAY DEVICE

(71) Applicant: LG Innotek Co., Ltd., Seoul (KR)

(72) Inventors: Jung Mok Lee, Seoul (KR); Jae Hyun Jin, Seoul (KR)

(73) Assignee: LG INNOTEK CO., LTD., Seoul (KR)

( * ) Notice: This patent is subject to a terminal disclaimer.

(21) Appl. No.: 15/668,572

(22) Filed: Aug. 3, 2017

Related U.S. Patent Documents

Reissue of:
(64) Patent No.: 9,244,209
Issued: Jan. 26, 2016
Appl. No.: 12/969,074
Filed: Dec. 15, 2010

(30) Foreign Application Priority Data

Dec. 15, 2009 (KR) ..... 10-2009-0124949

(51) Int. Cl.
*F21V 7/04* (2006.01)
*F21V 8/00* (2006.01)
(Continued)

(52) U.S. Cl.
CPC ..... *G02B 6/0023* (2013.01); *G02B 6/0026* (2013.01); *G02F 1/133615* (2013.01)

(58) Field of Classification Search
CPC .... G02B 6/0023; G02B 6/0026; G02B 6/009; G02B 6/0091; G02B 6/0068; G02B 6/0073
See application file for complete search history.

(56) References Cited

U.S. PATENT DOCUMENTS 7,538,340 B2 * 5/2009 Pang et al. ..... 257/21
7,607,815 B2 * 10/2009 Pang ..... 362/612
(Continued)

FOREIGN PATENT DOCUMENTS

JP 10-269822 A 10/1998
JP 2007-005098 A 1/2007
(Continued)

OTHER PUBLICATIONS

Office Action dated in Korean Application No. 10-2009-0124949, filed Oct. 30, 2014.
(Continued)

*Primary Examiner* — James A Menefee
(74) *Attorney, Agent, or Firm* — Saliwanchik, Lloyd & Eisenschenk

(57) ABSTRACT

Provided is a display device. The display device includes a circuit substrate, a light source electrically connected to the circuit substrate, the light source being disposed under the circuit substrate, and a light conversion member disposed on a light emitting surface of the light source and a side of the circuit substrate, the light conversion member converting a wavelength of light emitted from the light source. Here, the light conversion member is disposed also on a side surface of the circuit substrate and converts a wavelength of light emitted from the light source. Since the light conversion member is disposed on the side surface of the circuit substrate, the light conversion member may be aligned with the light source without interfering with the circuit substrate. Thus, the display device may effectively convert the wavelength of the light emitted from the light source to realize improved brightness and color impression.

20 Claims, 6 Drawing Sheets

(51) Int. Cl.
*G02F 1/1335* (2006.01)
*G02F 1/13357* (2006.01)

(56) References Cited

U.S. PATENT DOCUMENTS

| | | | | |
|---|---|---|---|---|
| 9,720,159 | B2 * | 8/2017 | Hyun | G02B 6/0003 |
| 9,720,160 | B2 * | 8/2017 | Hyun | G02B 6/0021 |
| 9,766,386 | B2 * | 9/2017 | Park | B82Y 20/00 |
| 9,829,621 | B2 * | 11/2017 | Park | G02B 6/0023 |
| 9,835,785 | B2 * | 12/2017 | Roh | H01J 11/44 |
| 10,042,103 | B2 | 8/2018 | Yeo et al. | |
| 10,054,730 | B2 * | 8/2018 | Roh | H01J 11/44 |
| 10,066,810 | B2 * | 9/2018 | Lee | B29D 11/00634 |
| 2006/0186431 | A1 * | 8/2006 | Miki et al. | 257/100 |
| 2006/0244358 | A1 | 11/2006 | Kim et al. | |
| 2007/0154199 | A1 * | 7/2007 | Chu | 396/106 |
| 2007/0284597 | A1 * | 12/2007 | Nawashiro et al. | 257/89 |
| 2007/0285943 | A1 * | 12/2007 | Ouderkirk | G02B 6/0001 362/609 |
| 2008/0173886 | A1 | 7/2008 | Cheon et al. | |
| 2008/0237540 | A1 | 10/2008 | Dubrow | |
| 2010/0308354 | A1 * | 12/2010 | David et al. | 257/98 |

FOREIGN PATENT DOCUMENTS

| | | | |
|---|---|---|---|
| KR | H10-269822 | A | 10/1998 |
| KR | 10-2006-0114523 | A | 11/2006 |
| KR | 10-2007-0037800 | A | 4/2007 |

OTHER PUBLICATIONS

Office Action dated Aug. 13, 2019 in U.S. Appl. No. 15/696,656.
Office Action dated in Korean Application No. Oct. 30, 2014, filed 10-2009-0124049.

* cited by examiner

DISPLAY DEVICE

Matter enclosed in heavy brackets [ ] appears in the original patent but forms no part of this reissue specification; matter printed in italics indicates the additions made by reissue; a claim printed with strikethrough indicates that the claim was canceled, disclaimed, or held invalid by a prior post-patent action or proceeding.

CROSS-REFERENCE TO RELATED APPLICATION

*Notice: More than one reissue application has been filed for the reissue of U.S. Pat. No. 9,244,209. The reissue applications are application Ser. Nos. 15/696,656 and 15/668,572 (the present application). Application Ser. No. 15/696,656 is a continuation reissue of application Ser. No. 15/668,572.*

[This application] *The present application is a reissue application of U.S. patent application Ser. No. 12/969,074, filed Dec. 15, 2010, now U.S. Pat. No. 9,244,209, which in turn* claims the benefit under 35 U.S.C. §119 of Korean Patent Application No. 10-2009-0124949, filed on Dec. 15, 2009, *the contents of* which [is] *are* hereby incorporated by reference in [its] *their* entirety.

BACKGROUND

Embodiments relate to a display device. Light emitting diodes (LEDs) are semiconductor devices that convert electricity into ultraviolet rays, infrared rays, or visible light using characteristics of compound semiconductors. The LEDs are being used for home appliances, remote controllers, large-scale screen, etc.

LED light sources having high brightness are being used for lighting lamps. In addition, since such an LED light source has high energy efficiency, low replacement cost due to a long life cycle, durability against vibration or shock, and does not use toxic substances such as mercury, existing incandescent lamps or fluorescent lamps are being replaced with LED light sources for energy-saving, environmental protection and reducing costs.

Also, LEDs are favorable for light sources of middle or large sized LCD televisions and monitors. The LEDs have superior color purity and low power consumption and allow easy miniaturization when compared to cold cathode fluorescent lamps (CCFLs) mainly used for light sources of the current liquid crystal displays (LCDs). Thus, the prototypes of these LEDs are being mass-produced, and also, researches with respect to the LEDs are being more actively conducted.

Recently, various technologies that use a blue LED and realize white light using a quantum dot (QD) emitting red light and green light as a phosphor are being developed. This is done because the white light realized using the quantum dot has high brightness and superior color reproductivity.

Nevertheless, the need of researches for reducing light losses, which may occur in case where the LED is applied to LED backlight units, and improving color uniformity is on the rise.

BRIEF SUMMARY

Embodiments provide a display device having improved brightness and/or high color reproductivity.

In one embodiment, a display device includes: a circuit substrate; a light source electrically connected to the circuit substrate, the light source being disposed under the circuit substrate; and a light conversion member disposed on a light emitting surface of the light source and a side of the circuit substrate, the light conversion member converting a wavelength of light emitted from the light source.

In another embodiment, a display device includes: a light source; and a light conversion member disposed on a light emitting surface of the light source, the light conversion member converting a wavelength of light emitted from the light source, wherein the light conversion member includes: a tube; a host disposed inside the tube; and a plurality of light conversion particles disposed inside the host, wherein the light source corresponds to the host.

In further another embodiment, a display device includes: a light guide plate; a display panel disposed on the light guide plate; a light source disposed on a side surface of the light guide plate; a light conversion member disposed between the light source and the light guide plate; and a circuit substrate electrically connected to the light source, wherein a side surface of the light conversion member faces a side surface of the circuit substrate.

The details of one or more embodiments are set forth in the accompanying drawings and the description below. Other features will be apparent from the description and drawings, and from the claims.

DETAILED DESCRIPTION

Figure 1:
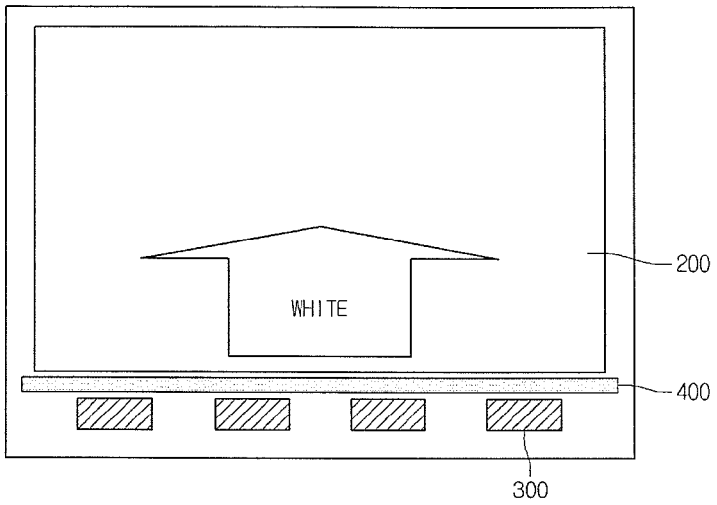
FIG. 1 is a view of a backlight unit according to a first embodiment.

In the descriptions of embodiments, it will be understood that when a substrate, a frame, a sheet, a layer, or a pattern is referred to as being 'on' a substrate, a substrate, a frame, a sheet, a layer, or a pattern, it can be directly on another layer or substrate, or intervening layers may also be present. Further, it will be understood that when a layer is referred to as being 'under' another layer, it can be directly under another layer, or one or more intervening layers may also be present. Further, the reference about 'on' and 'under' each layer will be made on the basis of drawings. In the drawings, the thickness or size of each layer may be exaggerated, omitted, or schematically illustrated for convenience in description and clarity. Also, the size of each element does not entirely reflect an actual size.

Figure 2:
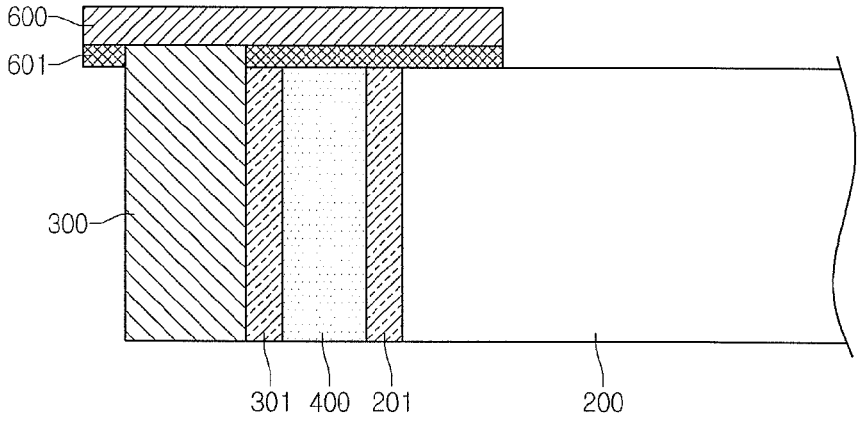
FIG. 2 is a sectional view of the backlight unit according to the first embodiment.
Figure 3:
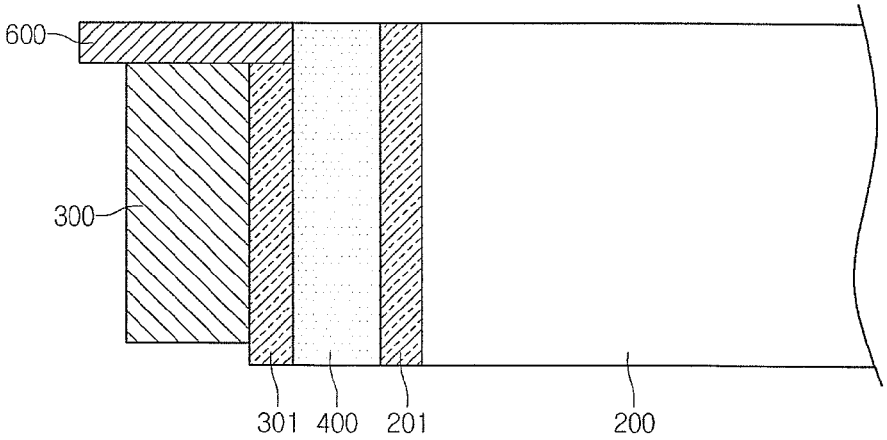
FIG. 3 is a sectional view of a backlight unit according to a second embodiment.

FIG. 1 is a view of a backlight unit according to a first embodiment. FIG. 2 is a sectional view of the backlight unit according to the first embodiment. FIG. 3 is a sectional view of a backlight unit according to a second embodiment.

Referring to FIG. 1, a light conversion member 400 in which a plurality of quantum dots, which are converted into light having a red or green wavelength when they receive light having a blue wavelength, is dispersed is disposed at front sides of blue LEDs 300, which constitute a backlight unit according to a first embodiment and emit blue light. When the blue light is irradiated onto the light conversion member 400, mixed light of blue, red, and green light is incident into a light guide plate 200 by the plurality of quantum dots dispersed in the light conversion member 400 to provide white light.

Here, when the white light is provided to the light guide plate 200 using the light conversion member 400, high color reproduction may be realized.

Referring to FIG. 2, the backlight unit may include a flexible printed circuit board (FPCB) 600, which transmits a signal from/into the LEDs 300 and supplies a power, on a top surface of each of the blue LEDs 300 emitting the blue light. An adhesion member 601 may be further disposed on a bottom surface of the FPCB 600.

Referring to FIG. 3, a backlight unit according to a second embodiment may have a structure in which brightness is improved and color reproductivity is increased.

The backlight unit according to the current embodiment includes LEDs 300 emitting blue light, a FPCB 600 connected to an upper end of the LEDs 300 to transmit a signal and supply a power, a light conversion member 400 in which a plurality of quantum dots is dispersed therein, the light conversion member 400 having a bar shape and disposed at front sides of the LEDs 300 connected to the FPCB 600, and a light guide plate 200 attached to a front side of the light conversion member 400. The light conversion member 400 has a width greater than that of each of the LEDs 300.

Here, adhesion layers 201 and 301 may be further disposed between the LEDs 300 and the light conversion member 400 and between the light conversion member 400 and the light guide plate 200.

Specifically, a second adhesion layer 301 is disposed between the LEDs 300 and the light conversion member 400, and a first adhesion layer 201 is disposed between the light conversion member 400 and the light guide plate 200.

The LEDs 300 and the light conversion member 400 and the light conversion member 400 and the light guide plate 200 may be easily coupled to each other by the adhesion layers 201 or 301. Here, the adhesion layers 201 and 301 are formed of a transparent adhesive resin, which transmits light. However, the present disclosure is not limited to materials of the adhesion layers 201 and 301.

Also, the adhesion layers 201 and 301 are disposed between the LEDs 300 and the light conversion member 400 and between the light conversion member 400 and the light guide plate 200 to index-match them to each other.

For the index matching, each of the adhesion layers 201 and 301 may have a refractive index of about 1.1 to about 1.6. Here, when the refractive index is greater than about 1.1, there is an advantage in that a reflectance of light emitted from a light source can be reduced to improve brightness. Also, when the refractive index is less than about 1.6, there is an advantage in that it can inhibit the light emitted from the light source from being increased in refractive and reflective degrees to improve brightness and transmittance.

The backlight unit according to the current embodiment provides the white light used for the liquid crystal display. The backlight unit is attached to a bottom surface of the liquid crystal display.

The LEDs 300 according to the current embodiment is attached to a front end of the light conversion member 400 to emit the blue light.

Specifically, the LEDs 300 emitting the blue light may be blue LEDs.

The FPCB 600 according to the current embodiment is connected to sides of the LEDs 300, e.g., upper or lower ends of the LEDs 300 to transmit a signal and supply a power.

The light conversion member 400 according to the current embodiment has a bar shape and is disposed at front sides of the LEDs 300 to which the FPCB 600 is connected to the upper end thereof.

Here, the bar shape represents a shape having a predetermined thickness and expanded in a length direction, e.g., a plate shape.

As shown in FIG. 3, the light conversion member 400 having the bar shape has a height greater than that of each of the LEDs 300. For example, the light conversion member 400 has the bar shape extending from a lower side of a lower end of each of the LEDs 300 to an upper end of the FPCB 600 connected to the upper end of each of the LEDs 300 and is center-aligned in a height direction of the LEDs 300 to inhibit light emitted from the LEDs 300, i.e., blue light from leaking to the outside, e.g., into the light guide plate 200.

Here, the height of each of the LEDs 300 represents a height from the upper end to the lower end of each of the LEDs 300 in the sectional view of FIG. 3.

The light conversion member 400 includes the plurality of quantum dots therein, i.e., quantum dots, which are converted into light having a red or green wavelength when the blue light is irradiated to emit red and green light.

The plurality of quantum dots is uniformly dispersed in the light conversion member 400, i.e., randomly dispersed in the light conversion member 400.

Specifically, the light conversion member 400 may have a structure in which a quantum dot mixture that is converted into the red or green light when the blue light is irradiated is injected and sealed into a tube.

Mixed light of the blue, red, and green light transmitting the light conversion member 400 is incident into the light guide plate 200 according to the current embodiment to provide the white light to the backlight unit.

An effect of the backlight unit according to the current embodiment including the foregoing components will be described below.

First, when the blue light is emitted from the LEDs 300, i.e., LEDs 300 emitting the blue light, the emitted blue light is incident into the light conversion member 400.

Here, a portion of the light incident into the light conversion member 400 transmits through the light conversion member 400 and is directly incident into the light guide plate 200.

Next, another portion of the light transmitting the light conversion member 400 is irradiated onto the quantum dots that are converted into light having the red wavelength when they receive the blue light, and further another portion of the light transmitting the light conversion member 400 is irradiated onto the quantum dots that are converted into light having the green wavelength when they receive the blue light.

Here, the light converted into the red and green light by being irradiated onto the quantum dots together with the blue light is incident into the light guide plate 200 to allow the backlight unit to emit the white light, i.e., white light similar to natural light.

Figure 4:
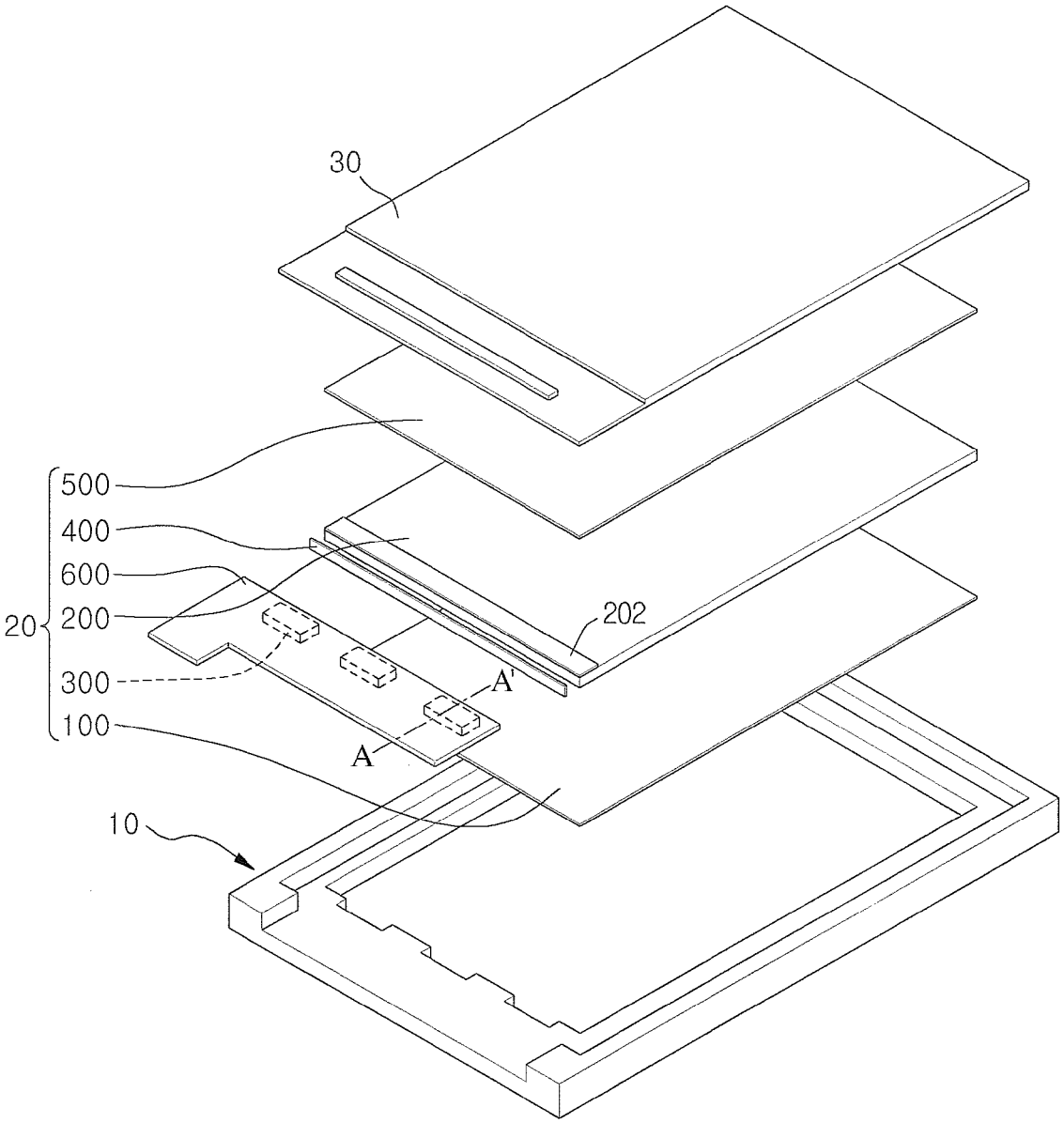
FIG. 4 is an exploded perspective view of a liquid crystal display according to a third embodiment.
Figure 5:
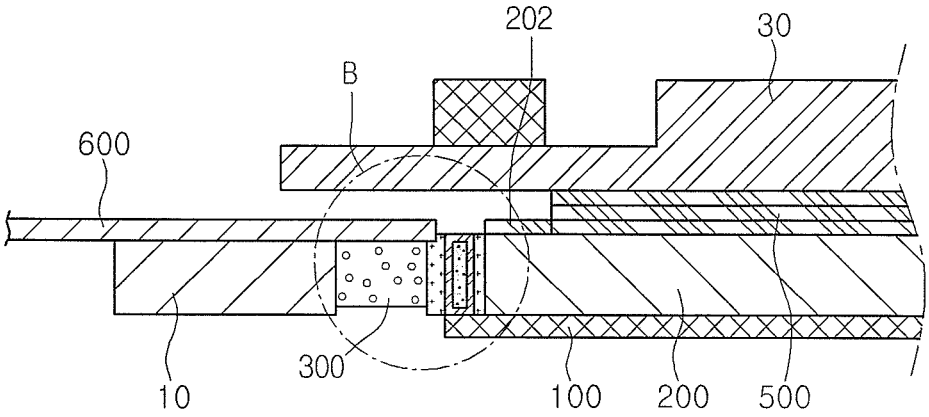
FIG. 5 is a sectional view taken alone line A-A' of FIG. 4.
Figure 6:
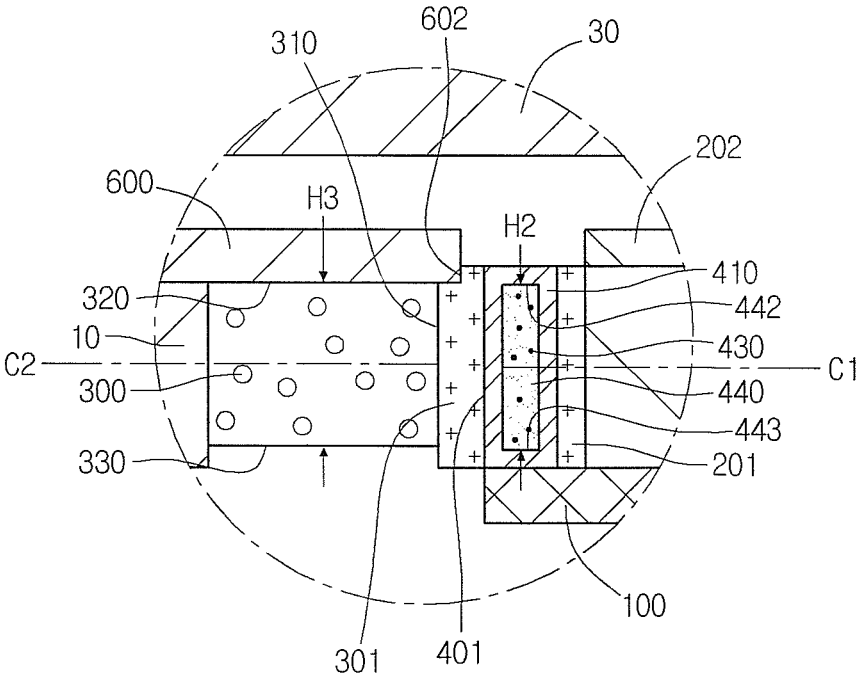
FIG. 6 is an enlarged sectional view illustrating a portion B of FIG. 5.
Figure 7:
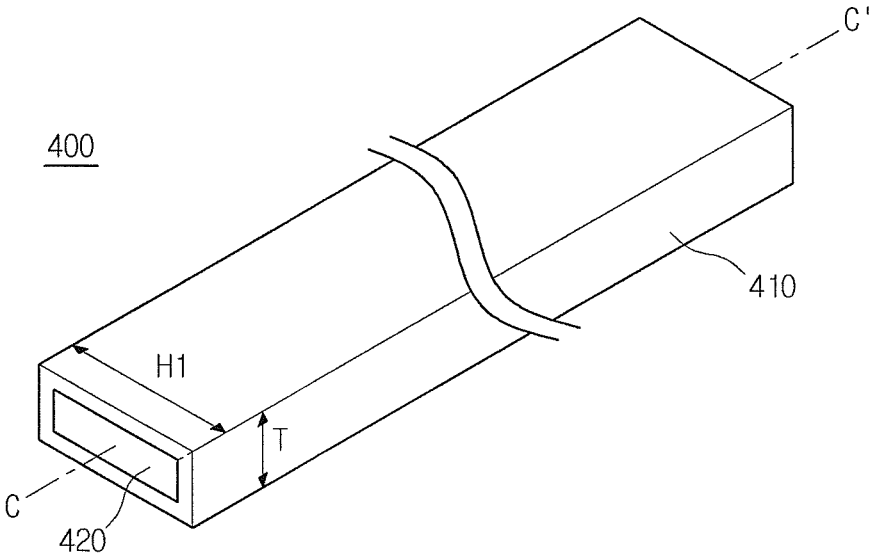
FIG. 7 is a perspective view of a light conversion member according the third embodiment.

FIG. 4 is an exploded perspective view of a liquid crystal display according to a third embodiment. FIG. 5 is a sectional view taken alone line A-A' of FIG. 4. FIG. 6 is an enlarged sectional view illustrating a portion B of FIG. 5. FIG. 7 is a perspective view of a light conversion member according the third embodiment.

Figure 8:
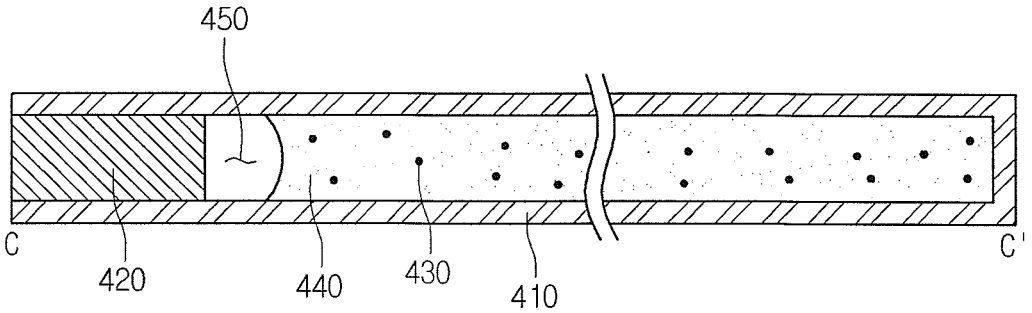
FIG. 8 is a sectional view taken along line C-C' of FIG. 7.
Figure 9:
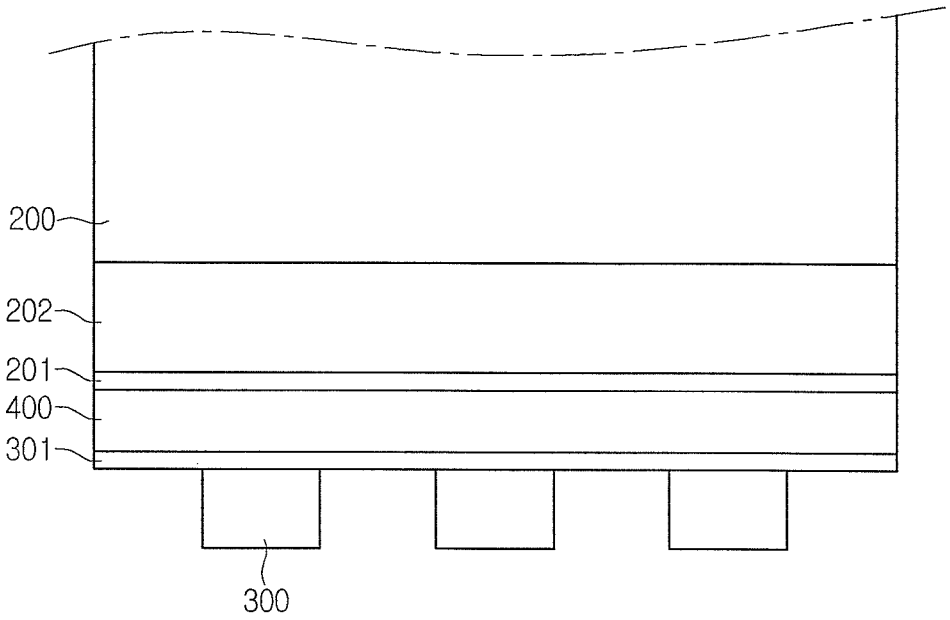
FIG. 9 is a plan view of a light emitting diode, a light conversion member, a light guide plate, and a reflective layer.
Figure 10:
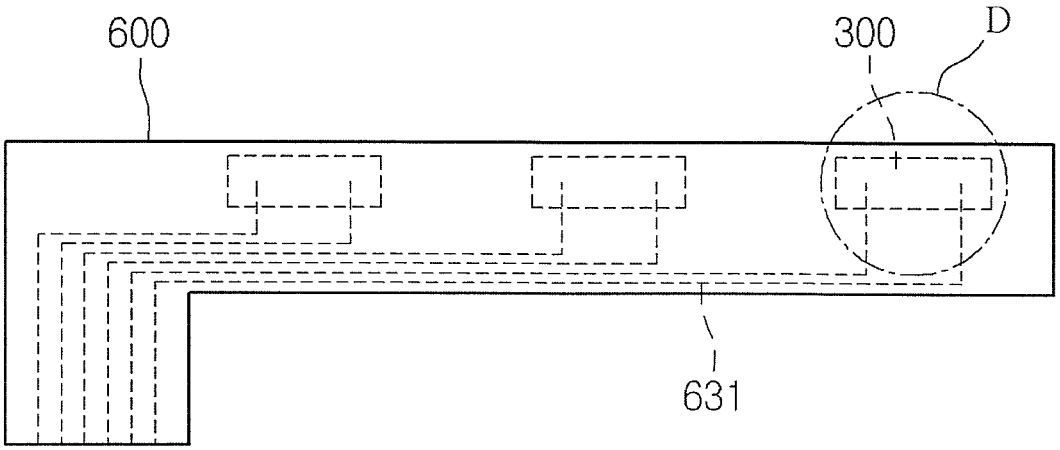
FIG. 10 is a plan view of a FPCB and LEDs.
Figure 11:
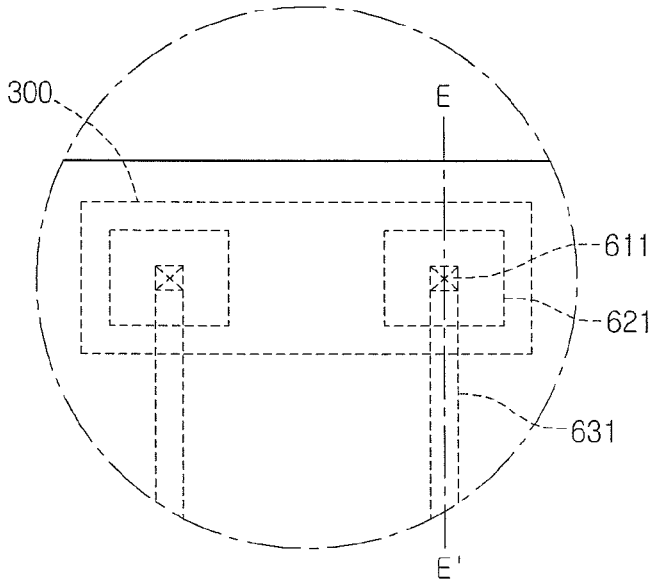
FIG. 11 is an enlarged view illustrating a portion D of FIG. 10.
Figure 12:
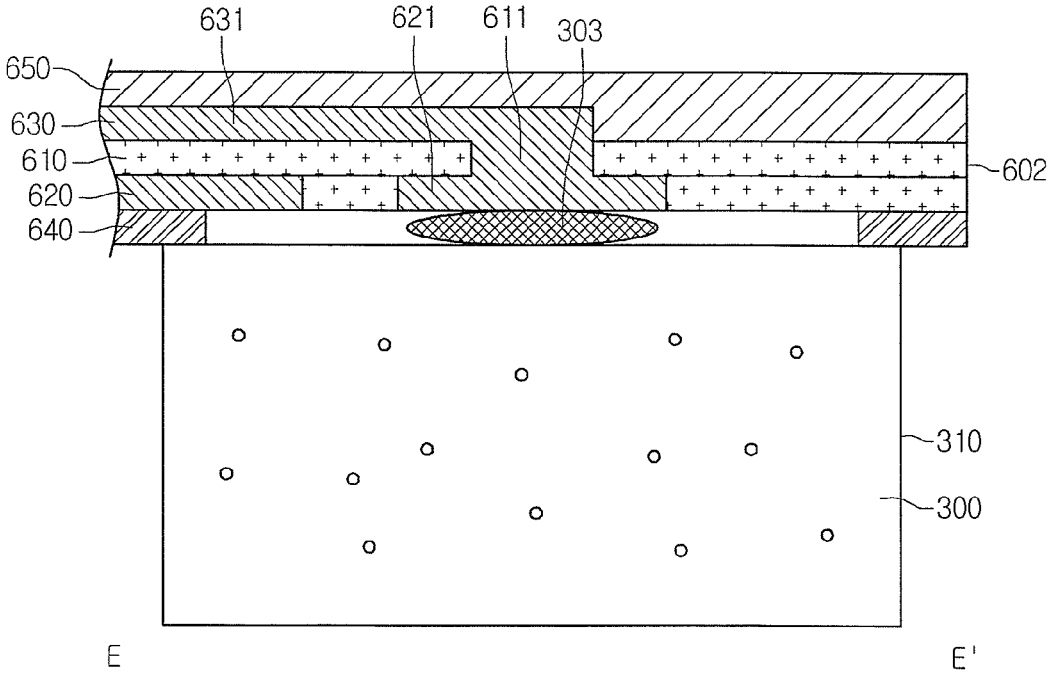
FIG. 12 is a sectional view taken along line E-E' of FIG. 11.

FIG. 8 is a sectional view taken along line C-C' of FIG. 7. FIG. 9 is a plan view of a light emitting diode, a light conversion member, a light guide plate, and a reflective layer. FIG. 10 is a plan view of a FPCB and LEDs. FIG. 11 is an enlarged view illustrating a portion D of FIG. 10. FIG. 12 is a sectional view taken along line E-E' of FIG. 11. Descriptions of this embodiment may be applied to those of the foregoing embodiments except modified portions.

Referring to FIGS. 4 to 12, a liquid crystal display according to the current embodiment includes a mold frame 10, a backlight assembly 20, and a liquid crystal panel 30.

The mold frame 10 receives the backlight assembly 20 and the liquid crystal panel 30. The mold frame 10 has a square frame. For example, the mold frame 10 may be formed of plastic or reinforcement plastic.

Also, a chassis surrounding the mold frame 10 and supporting the backlight assembly 20 may be disposed under the mold frame 10. The chassis may be disposed also on a side surface of the mold frame 10.

The backlight assembly 20 is disposed inside the mold frame 10 to generate light. Then, the backlight assembly 20 emits the generated light toward the liquid crystal panel 30. The backlight assembly 20 includes a reflective sheet 100, a light guide plate 200, a plurality of light emitting diodes (LEDs) 300, a light conversion member 400, a plurality of optical sheets 500, and a flexible printed circuit board (FPCB) 600.

The reflective sheet 100 reflects light emitted from the LEDs 300 upward.

The light guide plate 200 is disposed on the reflective sheet 100 and receives the light emitted from the LEDs 300 to reflect the light upward through reflection, refraction, and dispersion.

Referring to FIGS. 5, 6, and 9, a reflective layer 202 is disposed on a top surface of the light guide plate 200. The reflective layer 202 is disposed on a portion of the top surface of the light guide plate 200. In detail, the reflective layer 202 is disposed on a side surface of the light guide plate 200 corresponding to a side at which the LEDs 300 are disposed.

Specifically, referring to FIG. 9, the reflective layer 202 extends in a direction in which the light conversion member 400 extends. The reflective layer 202 reflects the light emitted from the LEDs 300 downward. The reflective layer 202 may be disposed in a region adjacent to the LEDs 300 to inhibit a hot spot phenomenon in which brightness in the region adjacent to the LEDs 300 is abnormally increased from occurring.

Specifically, in the current embodiment, the FPCB 600 is not disposed on the top surface of the light guide plate 200. Thus, the reflective layer 202 may be coated or deposited on the top surface of the light guide plate 200. In detail, a paint having high reflectance may be coated on the top surface of the light guide plate 200 to form the reflective layer 202. Alternatively, a metal such as Ag may be deposited on the top surface of the light guide plate 200 to form the reflective layer 202.

Although the reflective layer 202 is disposed on only the top surface of the light guide plate 200 in FIGS. 6 and 9, the present disclosure is not limited thereto. For example, the reflective layer 202 may be disposed also on a top surface of the light conversion member 400. That is, a paint may be coated also on the top surface of the light conversion member 400 or a metal is deposited also on the top surface of the light conversion member 400.

The LEDs 300 are disposed on a side surface of the light guide plate 200. In detail, the LEDs 300 are disposed on a light incident surface.

The LEDs 300 are light sources for generating light. In detail, the LEDs 300 emit light toward the light conversion member 400.

The LEDs 300 may be blue LEDS 300 generating the blue light or UV LEDs 300 generating ultraviolet ray. That is, the LEDs 300 may generate blue light having a wavelength band of about 430 nm to about 470 nm or ultraviolet ray having wavelength band of about 300 nm to about 40 nm.

The LEDs 300 are mounted on the FPCB 600. The LEDs 300 are disposed under the FPCB 600. The LEDs 300 receive a driving signal through the FPCB 600, and then are driven.

The light conversion member 400 is disposed between the LEDs 300 and the light guide plate 200. The light conversion member 400 adheres to the side surface of the light guide plate 200. In detail, the light conversion member 400 is attached to the light incident surface of the light guide plate 200. Also, the light conversion member 400 may adhere to the LEDs 300.

The light conversion member 400 receives light emitted from the LEDs 300 to convert a wavelength of the light. For example, the light conversion member 400 may convert blue light into green light and red light. That is, the light conversion member 400 may convert a portion of the blue light into the green light having a wavelength band of about 520 nm to about 560 nm and the other portion of the blue light into the red light having a wavelength band of about 630 nm to about 660 nm.

Also, the light conversion member 400 may convert an ultraviolet ray emitted from the LEDs 300 into blue, green, and red light. That is, the light conversion member 400 may convert a portion of the ultraviolet ray into blue light having a wavelength band of about 430 nm to about 470 nm, another portion of the ultraviolet ray into green light having a wavelength band of about 520 nm to about 560 nm, and further another portion of the ultraviolet ray into red light having a wavelength band of about 630 nm to about 660 nm.

Thus, the light transmitting the light conversion member 400 and the light converted by the light conversion member 400 may generate white light. That is, the blue light, the green light, and the red light may be combined with each other to generate the white light, and then, the generated white light may be incident into the light guide plate 200.

Referring to FIGS. 5 to 8, the light conversion member 400 includes a tube 410, a sealing member 420, a plurality of light conversion particles 430, and a host 440.

The tube 410 receives the sealing member 420, the light conversion particles 430, and the host 440. That is, the tube 410 may be a container for receiving the sealing member 420, the light conversion particles 430, and the host 440. Also, the tube 410 has a shape longitudinally extending in one direction.

The tube 410 may have a square tube shape. That is, the tube 410 may have a rectangular shape in a section of a direction perpendicular to a length direction thereof Also, the tube 410 may have a height H1 of about 0.6 mm and a thickness T of about 0.2 mm. That is, the tube 410 may be a capillary tube.

The tube 410 is transparent. For example, the tube 410 may be formed of a glass. That is, the tube 410 may be a glass capillary tube.

The sealing member 420 is disposed inside the tube 410. The sealing member 420 is disposed on an end of the tube 410. The sealing member 420 seals the inside of the tube 410. The sealing member 420 may be formed of an epoxy resin.

The light conversion particles 430 are disposed inside the tube 410. In detail, the light conversion particles 430 are uniformly dispersed in the host 440, and the host 440 is disposed inside the tube 410.

The light conversion particles 430 convert a wavelength of light emitted from the LEDs 300. The conversion particles 430 receive the light emitted from the LEDs 300 to convert the wavelength of the light. For example, the light conversion particles 430 may convert the blue light emitted from the LEDs 300 into green light and red light. That is, a portion of the light conversion particles 430 may convert the blue light into the green light having a wavelength band of about 520 nm to about 560 nm, and the other portion of the light conversion particles 430 may convert the blue light into the red light having a wavelength band of about 630 nm to about 660 nm.

On the other hand, the light conversion particles 430 may convert an ultraviolet ray emitted from the LEDs 300 into blue, green, and red light. That is, a portion of the light conversion particles 430 may convert the ultraviolet ray into blue light having a wavelength band of about 430 nm to about 470 nm, another portion of the light conversion particles 430 may convert the ultraviolet ray into green light having a wavelength band of about 520 nm to about 560 nm, and further another portion of the light conversion particles 430 may convert the ultraviolet ray into red light having a wavelength band of about 630 nm to about 660 nm.

That is, when the LEDs 300 are blue LEDs 300 emitting the blue light, the light conversion particles 430 for respectively converting the blue light into the green and red light may be used. On the other hand, when the LEDs 300 are UV LEDs 300 emitting the ultraviolet ray, the light conversion particles 430 for respectively converting the ultraviolet ray into the blue, green, and red light may be used.

The light conversion particles 430 may be a plurality of quantum dots. Each of the quantum dots may include a core nano crystal and a shell nano crystal surrounding the core nano crystal. Also, the quantum dot may include an organic ligand coupled to the shell nano crystal. Also, the quantum dot may include an organic coated layer surrounding to the shell nano crystal.

The shell nano crystal may have two-layered structure. The shell nano crystal is disposed on a surface of the core nano crystal. The quantum dot may convert a wavelength of light incident into the core nano crystal into light having a long wavelength through the shell nano crystal forming a shell layer to improve light efficiency.

The quantum dot may be formed of at least one material of a group II compound semiconductor, a group III compound semiconductor, a group V compound semiconductor, or a group VI compound semiconductor. In detail, the core nano crystal may be formed of Cdse, InGaP, CdTe, CdS, ZnSe, ZnTe, ZnS, HgTe, or HgS. Also, the shell nano crystal may be formed of CuZnS, CdSe, CdTe, CdS, ZnSe, ZnTe, ZnS, HgTe, or HgS. The quantum dot may have a diameter of about 1 nm to about 10 nm.

The wavelength of the light emitted from the quantum dot may be adjusted according to a size of the quantum dot or a molar ratio of a molecular cluster compound and a nano particle precursor in a synthesis process. The organic ligand may be formed of at least one of pyridine, mercapto alcohol, thiol, phosphine, and phosphine oxide. The organic ligand may stabilize the unstable quantum dot after the synthesis process is performed. After the synthesis process is performed, a dangling bond is formed outside the quantum dot. Thus, the quantum dot may be instable due to the dangling bond. However, one end of the organic ligand may be in a non-bonded state, and the non-bonded one end of the organic ligand may be bonded to the dangling bond to stabilize the quantum dot.

Specifically, when the quantum dot has a radius less than a Bohr radius of an exciton constituted by an electron and hole, which are excited by light and electricity, a quantum confinement effect may occur. Thus, the quantum dot has a discrete energy level to change an intensity of an energy gap. In addition, a charge may be limited within the quantum dot to provide high light emitting efficiency.

The quantum dot may be changed in emission wavelength according to a particle size thereof, unlike a general fluorescent dye. That is, when the particle size is gradually decreased, the quantum dot may emit light having a short wavelength. Thus, the particle size may be adjusted to emit visible light having a desired wavelength. Also, since the quantum dot has an extinction coefficient greater by about 100 times to about 1,000 times than that of the general fluorescent dye and quantum yield greater than that of the general fluorescent dye, the quantum dot may emit very intense light.

The quantum dot may be synthesized by a chemical wet etching process. Here, the chemical wet etching process is a process in which a precursor material is immersed into an organic solvent to grow particles. Thus, the quantum dot may be synthesized through the chemical wet etching process.

The host 440 surrounds the light conversion particles 430. That is, the light conversion particles 430 are uniformly dispersed into the host 440. The host 440 may be formed of a polymer. The host 440 is transparent. That is, the host 440 may be formed of a transparent polymer.

The host 440 is disposed inside the tube 410. That is, the host 440 is filled overall in the tube 410. The host 440 may be closely attached to an inner surface of the tube 410.

An air layer may be disposed between the sealing member 420 and the host 440. The air layer 450 is filled with nitrogen. The air layer 450 may serve as a buffer layer between the sealing member 420 and the host 440.

The light conversion member 400 adheres to the light guide plate 200. A first adhesion layer 201 is disposed between the light conversion member 400 and the light guide plate 200. The light conversion member 400 adheres to a side surface of the light guide plate 200 through the first adhesion layer 201.

The light conversion member 400 is closely attached to the first adhesion layer 201. In detail, the tube 410 is closely attached to the first adhesion layer 201.

The first adhesion layer 201 is transparent. The first adhesion layer 201 may be formed of an epoxy-based resin or an acryl-based resin.

The light conversion member 400 adheres to the LEDs 300. A second adhesion layer 301 is disposed between the light conversion member 400 and the LEDs 300. The light conversion member 400 may adhere to a light emitting surface 310 of each of the LEDs 300 through the second adhesion layer 301.

The light conversion member 400 is closely attached to the second adhesion layer 301. In detail, the tube 410 is closely attached to the second adhesion layer 301. The second adhesion layer 301 is transparent. The second adhesion layer 301 may be formed of an epoxy-based resin or an acryl-based resin.

The second adhesion layer 301 may be disposed also between the FPCB 600 and the light conversion member 400. That is, the second adhesion layer 301 may adhere also to a side surface 602 of the FPCB 600.

On the other hand, the side surface 602 of the FPCB 600 may directly contact a side surface 401 of the light conversion member 400.

The light conversion member 400 may be formed by following processes.

First, the light conversion particles 430 are uniformly dispersed in a resin composition. The resin composition is transparent. The resin composition may be photocurable.

Thereafter, the inside of the tube 410 is decompressed, an inlet of the tube 410 is immersed into the resin composition in which the light conversion particles 430 are dispersed, and an ambient pressure is increased. As a result, the resin composition in which the light conversion particles 430 are dispersed is introduced into the tube 410.

Thereafter, a portion of the resin composition introduced into the tube 410 is removed, and an inlet portion of the tube 410 is empty. Then, the resin composition introduced into the tube 410 is cured by an ultraviolet ray to form the host 440.

Thereafter, an epoxy-based resin composition is introduced into the inlet portion of the tube 410. Then, the introduced epoxy-based resin composition is cured to form the sealing member 420. The sealing member 420 formation process may be performed under nitrogen atmosphere. Thus, the air layer containing nitrogen may be disposed between the sealing member 420 and the host 440.

The optical sheets 500 are disposed on the light guide plate 200. The optical sheets 500 may improve characteristics of transmitted light.

The FPCB 600 is electrically connected to the LEDs 300. The LEDs 300 may be mounted on the FPCB 600. The FPCB 600 is flexible and disposed inside the mold frame 10. The FPCB 600 is disposed on the light guide plate 200.

The FPCB 600 is connected to a main board for driving the liquid crystal display according to an embodiment. That is, a signal for driving the LEDs 300 may be applied from the main board through the FPCB 600.

Referring to FIGS. 10 to 12, the FPCB 600 includes an insulation layer 610, a first interconnection layer 620, a second interconnection layer 630, a first protection layer 640, and a second protection layer 620.

The insulation layer 610 is disposed between the first interconnection layer 620 and the second interconnection layer 630. The insulation layer 610 insulates the first interconnection layer 620 from the second interconnection layer 630. The insulation layer 610 may be a support layer for supporting the first interconnection layer 620, the second interconnection layer 630, the first protection layer 640, and the second protection layer 620. The insulation layer 610 may be formed of polyimide.

The first interconnection layer 620 is disposed under the insulation layer 610. The first interconnection layer 620 is disposed on the LEDs 630. The first interconnection layer 620 may include a connection pad 621 connected to the LEDs 300. The LEDs 300 are connected to the connection pad 621 through a solder 303.

The second interconnection layer 630 is disposed on the insulation layer 610. The second interconnection layer 630 is disposed on the first interconnection layer 620. The second interconnection layer 630 may further include a connection wire 631 connected to the connection pad 621. In detail, the connection wire 631 is connected to the connection pad 621 through a via 611 passing through the insulation layer 610. Also, the connection wire 631 may pass through a region in which the LEDs 300 are disposed.

The first and second interconnection layers 620 and 630 may be formed of a metal having a low resistance such as copper, aluminum, or an alloy thereof.

The first protection layer 640 covers the first interconnection layer 620, and the second protection layer 650 covers the second interconnection layer 630. The first and second protection layers 640 and 650 protect the first and second interconnection layers 620 and 630, respectively. The first and second protection layers 640 and 650 may be formed of a polymer having high insulativity.

As described above, the FPCB 600 may include two or more interconnection layers 620 and 630. Thus, the FPCB 600 may realize a complicated wiring structure without extending in a side direction.

That is, since the FPCB 600 has a wiring structure in a vertical direction, a distance between the side surface 602 of the FPCB 600 and the light emitting surface 310 of each of the LEDs 300 may become narrower. In detail, the light emitting surface 310 of each of the LEDs 300 may be disposed on a horizontal plane substantially equal to the side surface 602 of the FPCB 600.

Referring to FIG. 6, the FPCB 600 is disposed on the LEDs 300. Also, the FPCB 600 does not extend to a top surface of the light conversion member 400 and a top surface of the light guide plate 200. That is, the FPCB 600 extends up to the side surface 401 of the light conversion member 400. Thus, the light conversion member 400 is disposed on a side of the FPCB 600. That is, the side surface 602 of the FPCB 600 faces the side surface 401 of the light conversion member 400.

Thus, the FPCB 600 and the LEDs 300 may be freely aligned with each other in a vertical direction with respect to the light conversion member 400. That is, since the FPCB 600 does not extend up to the top surface of the light conversion member 400, the LEDs 300 may accurately correspond to the light conversion member 400.

That is, since the distance between the side surface 602 of the FPCB 600 and the light emitting surface 310 of each of the LEDs 300 is very short, a center C2 of each of the LEDs 300 and a center of the light conversion member 400 may be easily aligned with each other. That is, the center C2 of each of the LEDs 300 may correspond to the center of the light conversion member 400. Here, the center C2 of each of the LEDs 300 and the center of the light conversion member 400 represent a center of a height direction reference surface.

Referring to FIGS. 5 and 6, the LEDs 300 are disposed corresponding to the host 400. In detail, the LEDs 300 are aligned with the light conversion member 400 so that the host 440 corresponds to the light emitting surface 310 through which light is substantially emitted, i.e., the effective light emitting surface 310. Here, a top surface 320 of each of the LEDs 300 may be disposed at a position lower than that of a top surface of the light conversion member 400, and a bottom surface 330 of each of the LEDs 300 may be disposed at a position higher than that of a bottom surface of the light conversion member 400.

The LEDs 300 may be disposed within a region in which the host 440 is disposed. That is, the center C2 of each of the LEDs 300 corresponds to the center C1 of the host 440. Here, each of the LEDs 300 may have a height H3 lower than that H2 of the host 440. Alternatively, each of the LEDs 300 may have a height H3 substantially equal to that H2 of the host 440. Similarly, the center C1 of the host represents the center of the height direction reference surface.

Also, the LEDs 300 may be disposed between a top surface 442 and a bottom surface 443 of the host 440. That is, the top surface 320 of each of the LEDs 300 may be disposed at a position lower than that of the top surface 442 of the host 440, and the bottom surface 330 of each of the LEDs 300 may be disposed on a position higher than that of the bottom surface 443 of the host 440.

Here, each of the LEDs 300 may have a height H3 of about 500 μm to about 700 μm. The host 440 may have a height H2 of about 500 μm to about 700 μm.

As described above, since each of the LEDs 300 is disposed corresponding to the host 440, the greater part of light emitted from the LEDs 300 transmits the host 440. Thus, the light emitted from the LEDs 300 may be effectively incident into the light conversion particles 430.

Thus, the liquid crystal display according to the current embodiment may effectively convert the light emitted from the LEDs 300 to realize improved brightness and color reproductivity.

The mold frame 10 and the backlight assembly 20 constitute a backlight unit. That is, the backlight unit includes the mold frame 10 and the backlight assembly 20.

The liquid crystal panel 30 is disposed inside the mold frame 10 and on the optical sheets 500.

The liquid crystal panel 30 adjusts an intensity of the transmitted light to display an image. That is, the liquid crystal panel 300 may be a display panel for display images. The liquid crystal panel 30 includes a TFT substrate, a color filter substrate, a liquid crystal layer between the TFT substrate and the color filter substrate, and polarizing filters.

In the liquid crystal display device according to the embodiments, the light conversion member is disposed on a side of a circuit substrate. That is, the side of the circuit substrate faces the side surface of the light conversion member. Thus, the light conversion member may be easily aligned with the light source without interfering with the circuit substrate.

In detail, the light source may be easily aligned with the host. Specifically, the light source may be disposed between the top surface and the bottom surface of the host, the greater part of light may be incident into the host. As a result, the light emitted from the light source may be effectively incident into the light conversion particles dispersed in the host.

Therefore, the liquid crystal display according to the embodiments may effectively convert the light emitted from the light source to realize the improved brightness and color reproductivity.

Any reference in this specification to "one embodiment," "an embodiment," "example embodiment," etc., means that a particular feature, structure, or characteristic described in connection with the embodiment is included in at least one embodiment of the invention. The appearances of such phrases in various places in the specification are not necessarily all referring to the same embodiment. Further, when a particular feature, structure, or characteristic is described in connection with any embodiment, it is submitted that it is within the purview of one skilled in the art to effect such feature, structure, or characteristic in connection with other ones of the embodiments.

Although embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

[1. A display device comprising:

a circuit substrate;

a plurality of light sources electrically connected to the circuit substrate;

a light conversion member disposed on light emitting surfaces of the light sources and a side of the circuit substrate and separated from the light sources, the light conversion member converting a wavelength of lights emitted from the light sources;

a light guide plate disposed at a front side of the light conversion member;

a first adhesion layer in direct physical contact with the light conversion member and the light guide plate; and a second adhesion layer in direct physical contact with the light sources and the light conversion member, wherein the first adhesion layer and the second adhesion layer each has a refractive index of from about 1.1 to about 1.6.]

[2. The display device of claim 1, wherein the light conversion member comprises:

a host;

a plurality of light conversion particles dispersed in the host;

a tube surrounding the host and formed of transparent material; and a sealing member disposed on an inlet portion of the tube and separated from the host, and wherein a center of each of the light emitting surfaces corresponds to a center of the host.]

[3. The display device of claim 1, wherein the light conversion member has a bar shape having a predetermined thickness and expanded in a length direction.]

[4. The display device of claim 2, wherein the light sources are disposed between a top surface and a bottom surface of the host, and wherein the light emitting surfaces of the light sources correspond to the host.]

[5. The display device of claim 1, wherein a side surface of the circuit substrate faces the side surface of the light conversion member.]

[6. The display device of claim 5, wherein the side surface of the circuit substrate is in direct physical contact with the second adhesion layer.]

[7. The display device of claim 1, wherein the circuit substrate comprises:

a first interconnection layer comprising a connection pad; and a second interconnection layer disposed on the first interconnection layer, wherein the light sources are electrically connected to the connection pad, and the second interconnection layer comprises a connection wire connected to the connection pad.]

[8. The display device of claim 7, wherein the circuit substrate further comprises:

an insulation layer disposed between the first interconnection layer and the second interconnection layer; and a via passing through the insulation layer, the via being connected to the connection pad and the connection wire.]

[9. A display device comprising:

a plurality of light sources;

a light conversion member disposed on a light emitting surface of each of the light sources and separated from the light sources, the light conversion member converting a wavelength of light emitted from the light sources;

a light guide plate disposed at a front side of the light conversion member;

a first adhesion layer in direct physical contact with the light conversion member and the light guide plate; and a second adhesion layer in direct physical contact with the light sources and the light conversion member, wherein the first adhesion layer and the second adhesion layer each has a refractive index of from about 1.1 to about 1.6.]

[10. The display device of claim 9, wherein the light conversion member comprises:

the host;

a plurality of light conversion particles dispersed in the host;

a tube surrounding the host and formed of transparent material; and a sealing member disposed on an inlet portion of the tube and separated from the host, and wherein a center of each of the light sources corresponds to a center of the host.]

[11. The display device of claim 10, wherein each of the light sources has a height equal to or lower than a height of the host.]

[12. The display device of claim 9, wherein each of the light sources emits blue light, and the light conversion member converts the blue light into green light or red light.]

[13. The display device of claim 9, wherein each of the light sources has a height of about 500 μm to about 700 μm, and the host has a height of about 500 μm to about 700 μm.]

[14. A display device comprising:

a light guide plate;

a display panel disposed on the light guide plate;

a plurality of light sources disposed on a side surface of the light guide plate;

a light conversion member disposed between the light sources and the light guide plate and separated from the light sources;

a first adhesion layer in direct physical contact with the light conversion member and the light guide plate;

a second adhesion layer in direct physical contact with the light sources and the light conversion member; and a circuit substrate electrically connected to the light sources, wherein the first adhesion layer and the second adhesion layer each has a refractive index of from about 1.1 to about 1.6.]

[15. The display device of claim 14, wherein the circuit substrate comprises:

a first interconnection layer comprising a connection pad; and a second interconnection layer disposed on the first interconnection layer, wherein the light sources are electrically connected to the connection pad, and the second interconnection layer comprises a connection wire connected to the connection pad.]

[16. The display device of claim 14, wherein the light conversion member comprises:

a host;

a plurality of light conversion particles dispersed in the host;

a tube surrounding the host and formed of transparent material; and a sealing member disposed on an inlet portion of the tube and separated from the host, and wherein the light sources are disposed between a top surface and a bottom surface of the host.]

[17. The display device of claim 14, further comprising a reflective layer disposed on the light conversion member and the light guide plate.]

[18. The display device of claim 17, wherein the light conversion member is disposed on the reflective layer.]

[19. The display device of claim 14, further comprising a reflective layer extending in a direction equal to that of the light conversion member, the reflective layer being disposed on the light guide plate.]

[20. The display device of claim 14, wherein a top surface of each of the light sources is disposed at a position lower than that of the light conversion member, and a bottom surface of each of the light sources is disposed at a position higher than that of the light conversion member.]

*21. A backlight assembly comprising:*

*a reflective sheet;*

*a light guide plate on the reflective sheet;*

*an optical sheet on the light guide plate;*

*a light source disposed at an incident surface of the light guide plate; and*

*a light conversion member between the light source and the light guide plate;*

*wherein the light conversion member comprises:*

*a tube;*

*a host in the tube;*

*an air layer in the tube; and*

*a plurality of quantum dots in the host,*

*wherein the tube comprises:*

*a light incident part;*

*a light exit part opposite to the light incident part;*

*a first distal end;*

*a second distal end opposite to the first distal end;*

*a first tube portion;*

*a second tube portion adjacent to the first tube portion; and*

*a midpoint between the distal end and the second distal end along a first direction that is parallel to a central longitudinal axis of the tube,*

*wherein the first tube portion extends from the first distal end to the midpoint and comprises the air layer and a portion of the host,*

*wherein the second tube portion extends from the midpoint to the second distal end and comprises a portion of the host,*

*wherein a length of the portion of the host of the first tube portion, taken in the first direction, is less than a length of the portion of the host of the second tube portion, taken in the first direction,*

*wherein the tube extends along the incident surface of the light guide plate, and*

*wherein the backlight unit comprises at least one of the following:*

*a first adhesion layer disposed on the light exit part, the first adhesion layer having a refractive index of 1.1 to 1.6; and*

*a second adhesion layer disposed on the incident part, the second adhesion layer having a refractive index of 1.1 to 1.6.*

*22. The backlight assembly of claim 21, wherein the tube includes glass.*

*23. The backlight assembly of claim 21, wherein the air layer includes nitrogen.*

*24. The backlight assembly of claim 21, wherein the mass of the portion of the host of the first tube portion is smaller than the mass of the portion of the host of the second tube portion.*

*25. The backlight assembly of claim 21, wherein the first tube portion comprises a first sealing portion and the second tube portion comprises a second sealing portion.*

*26. The backlight assembly of claim 25, wherein the first sealing portion seals the first tube portion and comprises a material different from the tube.*

*27. The backlight assembly of claim 21, wherein the air layer is in direct contact with the host in the first tube portion.*

*28. The backlight assembly of claim 27, wherein at least a portion of a surface of the host in contact with the air layer is curved.*

*29. A display device comprising:*

*a frame;*

*a backlight assembly on the frame; and*

*a liquid crystal panel on the backlight assembly;*

*wherein the backlight assembly comprises:*

*a reflective sheet;*

*a light guide plate on the reflective sheet;*

*an optical sheet on the light guide plate;*

*a light source disposed at an incident surface of the light guide plate; and*

*a light conversion member between the light source and the light guide plate;*

*wherein the light conversion member comprises:*

*a tube;*

*a host in the tube;*

*an air layer in the tube; and*

*a plurality of quantum dots in the host,*

*wherein the tube comprises:*

*a light incident part;*

*a light exit part opposite to the light incident part;*

*a first distal end;*

*a second distal end opposite to the first distal end;*

*a first tube portion;*

*a second tube portion adjacent to the first tube portion; and*

*a midpoint between the distal end and the second distal end along a first direction that is parallel to a central longitudinal axis of the tube,*

*wherein the first tube portion extends from the first distal end to the midpoint and comprises the air layer and a portion of the host,*

*wherein the second tube portion extends from the midpoint to the second distal end and comprises a portion of the host,*

*wherein a length of the portion of the host of the first tube portion, taken in the first direction, is less than a length of the portion of the host of the second tube portion, taken in the first direction,*

*wherein the tube extends along the incident surface of the light guide plate, and*

*wherein the backlight unit comprises at least one of the following:*

*a first adhesion layer disposed on the light exit part, the first adhesion layer having a refractive index of 1.1 to 1.6; and*

*a second adhesion layer disposed on the incident part, the second adhesion layer having a refractive index of 1.1 to 1.6.*

*30. The display device of claim 29, wherein the tube comprises:*

*a top part extending from the light incident part to the light exit part; and*

*a bottom part extending from the light incident part to the light exit part and opposite to the top part.*

*31. The display device of claim 30, the backlight unit comprising the first adhesion layer disposed on the light exit part.*

*32. The display device of claim 30, the backlight unit comprising the second adhesion layer disposed on the incident part.*

*33. The display device of claim 32, comprising a printed circuit board (PCB) on which the light source is disposed, wherein the second adhesion layer is disposed between the light conversion member and the PCB.*

*34. The display device of claim 29, wherein the tube includes glass.*

*35. The display device of claim 29, wherein the air layer includes nitrogen.*

*36. The display device of claim 29, wherein the mass of the portion of the host of the first tube portion is smaller than the mass of the portion of the host of the second tube portion.*

*37. The display device of claim 29, wherein the first tube portion comprises a first sealing portion and the second tube portion comprises a second sealing portion.*

*38. The display device of claim 37, wherein the first sealing portion seals the first tube portion and comprises a material different from the tube.*

*39. The display device of claim 29, wherein the air layer is in direct contact with the host in the first tube portion.*

*40. The display device of claim 39, wherein at least a portion of a surface of the host in contact with the air layer is curved.*

* * * * *